United States Patent [19]
Badovinac

[11] 3,742,637
[45] July 3, 1973

[54] FISHING SLINGSHOT
[76] Inventor: Peter Badovinac, 4069 Dille Avenue, Cleveland, Ohio, 44127
[22] Filed: Nov. 8, 1971
[21] Appl. No.: 196,620

[52] U.S. Cl. ................................................ 43/19
[51] Int. Cl. ...................... A01k 87/00, A01k 91/02
[58] Field of Search .......................... 43/19, 25, 6; 124/22, 20, 21, 17

[56] References Cited
UNITED STATES PATENTS
1,376,260  4/1921  Davis ................................. 43/19
3,129,525  4/1964  Lewis ................................. 43/19
3,525,173  8/1970  Pickering ........................... 43/19

Primary Examiner—Warner H. Camp

[57] ABSTRACT

A device for discharging an arrow with artificial lure and line attached consists primarily of a frame member removably mounted to a fishing rod and including an elastic band means for propelling the arrow or a sinker and baited hook.

2 Claims, 3 Drawing Figures

PATENTED JUL 3 1973
3,742,637
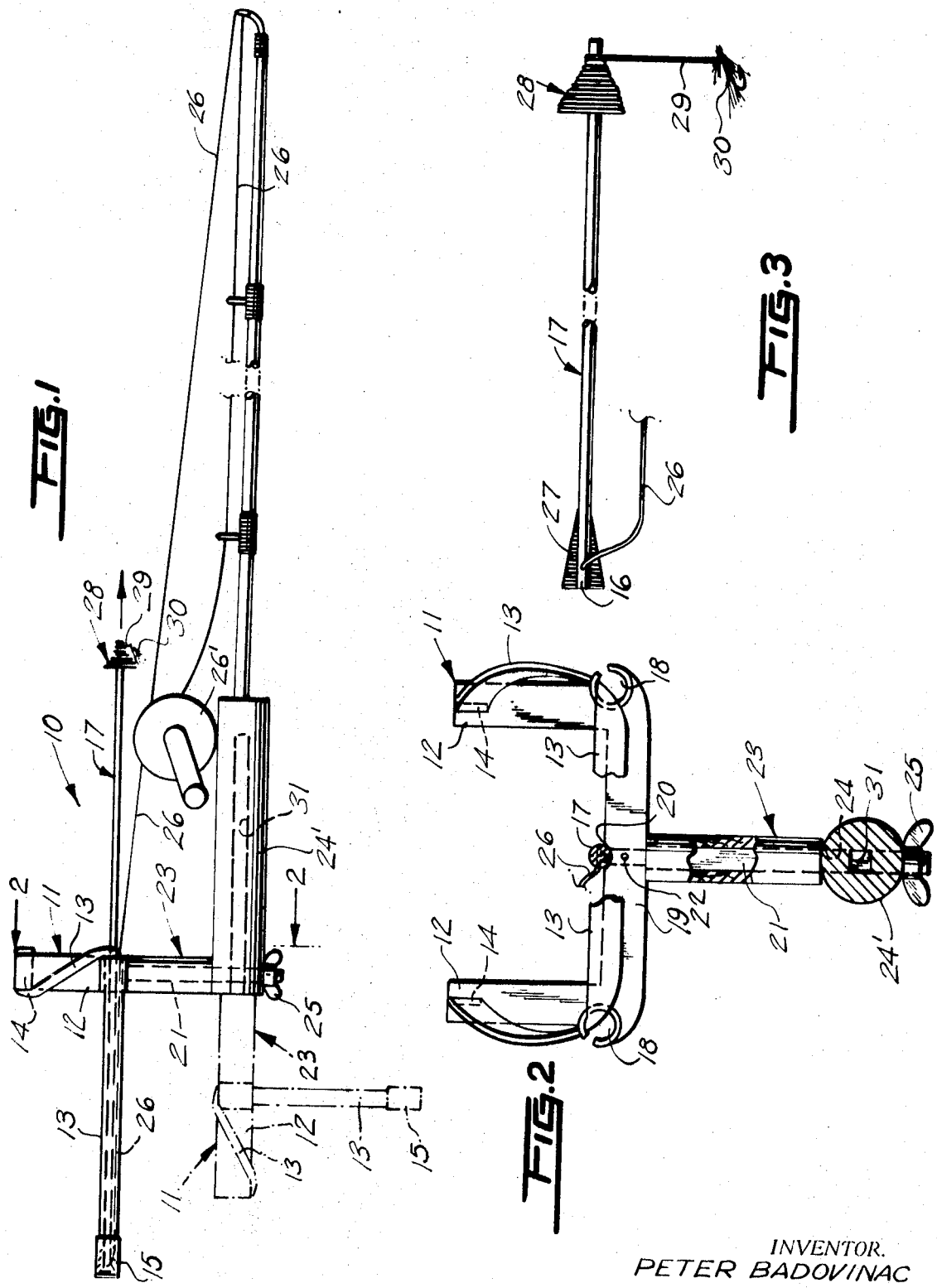
INVENTOR.
PETER BADOVINAC

FISHING SLINGSHOT

This invention relates to slingshot device, and more particularly to a fisherman's slingshot device.

It is therefore the primary purpose of this invention to provide a fisherman's slingshot which will enable a fisherman to discharge his bait and line accurately by means of an arrow or the like.

Another object of this invention is to provide a device of the type described which will have a frame member that will be removably mountable to the butt of the fisherman's rod.

Another object of this invention is to provide a slingshot device which will include spool means on one end of the arrow for carrying a line to which is attached the artificial lure or fly and the opposite end of the arrow will have fixedly secured to it the line extending to the fishing reel mounted upon the butt of the fishing rod.

A further object of this invention is to provide a device of the type described which will be adaptable to being placed within the end of the butt of a fishing rod on the longitudinal axis thereof in order that a sling portion of the device will be able to discharge a sinker and baiting hook if desired, the butt being held in a vertical position in order to discharge the sinker and baited hook.

A still further object of this invention is to provide a slingshot type device which will be readily removable from the butt of the fishing rod and may be used to discharge arrows having a suction cup on one end, the device then performing as a toy slingshot.

A further object of this invention is to provide a device of the type described which may be utilized as a slingshot for hunting purposes, the sling being adaptable to the use of various type missiles, including arrow or darts having hunting tips thereon.

Other objects of this invention are to provide a fisherman's slingshot which is simple in design, inexpensive to manufacture, rugged in construction, easy to use and efficient in operation.

These and other objects will be readily evident upon a study of the following specification and the accompanying drawing, wherein:

FIG. 1 is a side view of the present invention shown mounted in place upon a fishing rod, the alternate position being shown in phantom lines for the discharge of a sinker and baited hook;

FIG. 2 is a an enlarged cross sectional view taken along the line 2—2 of FIG. 1; and FIG. 3 is an enlarged horizontal view of the arrow of the device of FIG. 1, shown in elevation.

According to this invention, a slingshot device 10 is shown to include a U-shaped member 11 having a pair of arms 12. From the arms 12 is secured an elastic band 13 secured within the end openings 14 in a well known manner. A reinforced portion 15 of the band 13 provides a means of accommodating the end 16 of an arrow 17.

It will be noted that the sides of band 13 are carried within the circular open slots 18 of the horizontal portion 19 of U-shaped member 11. A recessed area 20 of horizontal portion 19 provides for guiding and alignment of arrow 17 when it is placed therein.

A square configurated shaft 21 is secured within the horizontal portion 19 of member 11, by means of pin 22 and shaft 21 is carried within handle member 23 of the device 10. Shaft 21 may be extended transversely through opening 24 of the butt 24'. The extending and threaded end of shaft 21 removably carries a winged nut fastener 25 which prevents device 10 from falling out of the opening 24 of butt member 24'.

The fishing line 26 of reel 26', is fixedly secured within the end 16 of arrow 17 within the finned area 27. The opposite end of arrow 17 includes a spool portion 28 carrying line 29 to which is attached a fly 30.

In use, the device 10 is used to placing the end 16 of arrow 17 within the reinforced portion 15 of the elastic band 13. The reinforced portion 15 and the end 16 of arrow 17, are urged rearwardly, and when released by the fisherman, the arrow 17 and its appendages are discharged in the direction that the fisherman aims device 10.

When a fish is caught, the fisherman then attends the reel 26' thus retrieving the fish, the arrow 17, and its attached components. For discharging a sinker, hook and bait, the device 10 may have its shaft 21 placed within the longitudinal opening 31 of the butt 24' of the fishing rod.

In the above mentioned arrangement, the fishing bow will be held in a vertical manner and while the fisherman grasps the handle 23 the reinforced portion 15 containing the sinker, hook and bait may be urged rearward and thus when released will discharge the sinker and hook in a manner similarly described of the arrow 17 or like projectile.

It shall be noted that the sling device 10 may be removed in its entirety from the fishing rod, and may be used as a toy slingshot for discharging suction cup ended arrows or the like or may be adapted to discharge hunting arrows, darts or other missiles.

I claim:

1. A casting device comprising a fishing rod including a butt portion having an opening therein and a reel member having a fishing line wound thereon, a U-shaped member including a pair of spaced upstanding arms connected by a horizontal arm, an elastic band connected to said upstanding arms, a shank member having one end secured to said horizontal arm and its opposite end received in the opening in said butt portion, a handle member sleeved over a portion of said shank, an arrow including spool means at one end for retaining a length of line attached to an artificial lure, and means securing the free end of said fishing line on said reel to the opposite end of said arrow.

2. The combination according to claim 1, wherein said horizontal arm includes a recessed area for aligning said arrow and a circular slot at each end thereof for retaining said band in a spread position, said band having a reinforced portion to provide a cup for receiving an end of said arrow.

* * * * *